Feb. 18, 1947.   C. M. OSTERHELD   2,415,966
LIGHT-SENSITIVE CELL THERMAL RETARDER IN WATER HEATER CONTROL SYSTEMS
Filed Aug. 27, 1945
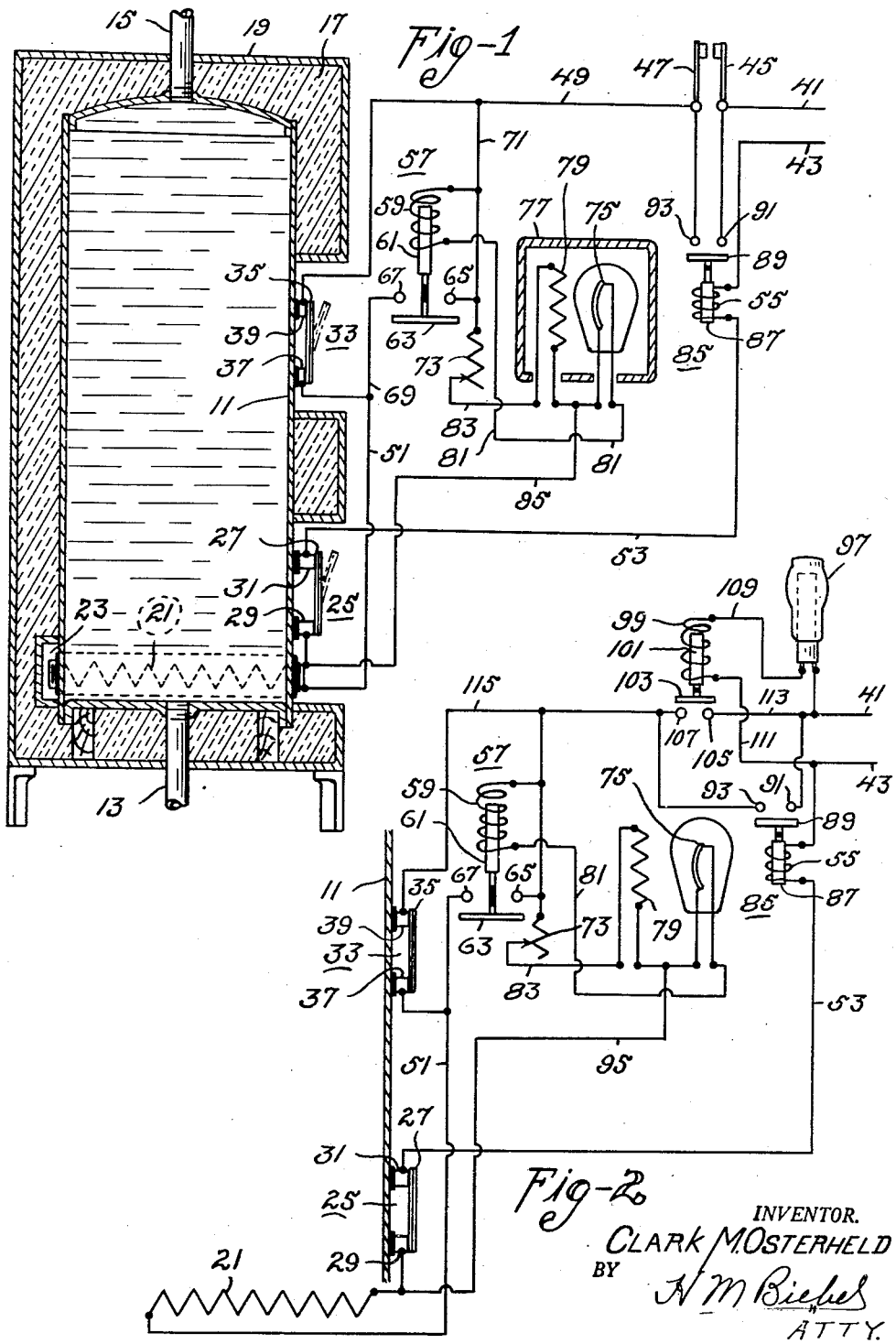
INVENTOR.
CLARK M. OSTERHELD
BY
ATTY.

Patented Feb. 18, 1947

2,415,966

UNITED STATES PATENT OFFICE 2,415,966

LIGHT-SENSITIVE CELL THERMAL RETARDER IN WATER HEATER CONTROL SYSTEMS

Clark M. Osterheld, Stoughton, Wis., assignor to McGraw Electric Company, Elgin, Ill., a corporation of Delaware Application August 27, 1945, Serial No. 612,887

18 Claims. (Cl. 219—39)

1

My invention relates to electric heating and particularly to control systems for electric water heaters.

An object of my invention is to provide a relatively simple system for controlling an electric heater for a domestic hot water tank that shall be effective to cause energization of the heater immediately after withdrawal of a relatively large quantity of hot water from the tank and to cause energization of the heater with a predetermined time delay period in case of withdrawal of a relatively small quantity of hot water from a tank, said energization being started after beginning of an off-peak period or after nightfall.

Another object of my invention is to provide a heater control system effective to cause selective energization of the electric heater immediately or with a time delay period in dependence on the amount of hot water withdrawn from a tank and that shall be effective to cause deenergization of the heater when substantially all of the water in the tank is hot.

Another object of my invention is to provide a heater control system for a hot water tank that shall be effective to cause selective energization of the heater immediately or with a time delay period upon starting of an off-peak period or of nighttime in accordance with the amount of hot water withdrawn from a tank during the on-peak period.

Other objects of my invention will either be apparent from a description of the forms embodying my invention or will be pointed out hereinafter and will be particularly set forth in the appended claims.

In the single sheet of drawings,

Figure 1 is a view in vertical section through a domestic hot water tank, the electric heater of which is controlled by a system embodying my invention and including an off-peak time controlled switch, and Fig. 2 is a diagram of connections of a modified form of system embodying my invention and including a light-sensitive cell.

Referring first of all to Fig. 1 of the drawing, I have there shown a hot water tank 11 as being of the usual commercial kind having a lower cold water inlet 13 connected thereto and an upper hot water outlet 15 also connected thereto. The tank is adapted to be surrounded by a mass 17 of heat insulating material which is adapted to be maintained in proper operative position by an outer sheet metal casing 19.

The system includes a single electric heater 21 which is adapted to be positioned adjacent the lower end portion of tank 11. I may locate the heater 21 in a tunnel member 23, all as now well-known in the art.

I provide a first or lower thermally-actuable heater control switch designated generally by numeral 25 and while I have shown details thereof, I do not desire to be limited thereto. The thermally-actuable switch 25 comprises a bimetal bar 27 having, say, its lower end secured rigidly against a fixed contact 29 while its upper end is adapted to be engaged with and disengaged from a second fixed contact 31. The design, construction and adjustment of the thermal switch 25 is such that bimetal bar 27 or its equivalent will be in current-conducting engagement with the fixed contact 31 when subject to cold water in the tank and bimetal bar 27 will have flexed to the position shown by the broken lines in Fig. 1 when subject to hot water in the tank. By cold water I mean water the temperature of which may vary from 70° F. to a value on the order of 130° to 140° F. while by hot water I mean water the temperature of which has a value on the order of 150° F.

I provide a second thermally-actuable switch 33 comprising a bimetal bar 35 having its lower end, say fixedly secured against a fixed contact 37 while its upper end is adapted to be moved into engagement with a fixed contact 39 and be disengaged therefrom in accordance with whether the bimetal bar 35 is subject to cold water in the tank or to hot water in the tank.

I provide a pair of supply circuit conductors 41 and 43 as well as a time controlled off-peak switch comprising two contact arms 45 and 47. The design, construction and adjustment of the time controlled switch is such that the two contact arms 45 and 47 thereof will be in current-conducting engagement during all off-peak periods, while they will be out of engagement with one another during all on-peak periods. It is to be understood that when I refer to a single off-peak period as lasting from, say 11 p. m. to 6 a. m., I do not desire to be limited thereto since an off-peak period occurring during the afternoon may also be included.

Supply circuit conductor 41 is connected to contact arm 45 while contact arm 47 is connected by a conductor 49 to fixed contact 39 of the upper thermally-actuable switch. Fixed contact 37 is connected by a conductor 51 to one terminal of heater 21, while the other terminal of heater 21 is connected to fixed contact 29. Fixed contact 31 is connected by a conductor 53 to one terminal of a coil 55, the other terminal of which is connected to the second supply circuit conductor 43.

I provide an electromagnetic switch 57 comprising a coil 59, an armature core 61 adapted to be energized by said coil 59 and having connected therewith a contact bridging member 63 which is adapted to be engaged with and disengaged from two fixed contacts 65 and 67. Fixed contact 67 is adapted to be engaged with conductor 51 by a conductor 69. Fixed contact 65 is adapted to be engaged with conductor 49 as well as one terminal of coil 59 by a conductor 71. Conductor 71 also connects to one terminal of an adjustable rheostat 73.

Means for controlling the energization of coil 59 comprises a light-sensitive cell 75 which is adapted to be mounted in a non-light-transmitting casing 77 with a relatively small resistor 79. The other terminal of coil 59 is adapted to be connected by a conductor 81 to one terminal of the light-sensitive cell 75, the other terminal of which is connected with one terminal of the resistor 79, the other terminal of which is connected by a conductor 83 to a contact arm adapted to be movably mounted on the adjustable resistor 73.

The design, construction and adjustment of the resistor 79 is such that when energized as will be hereinafter set forth and after it has been energized for a predetermined length of time, say, on the order of four or five hours, the wire resistor will become incandescent to a degree sufficient to affect the light-sensitive cell 75 whereby to cause it to become conducting. This time delay period may be varied by adjusting the contact arm of resistor 73.

In order to permit of heating substantially all of the water in tank 11 before deenergization of the heater 21, I provide a second heater current-controlled electromagnetic switch 85 which includes in addition to coil 55 a core 87, a contact bridging member 89, which latter is adapted to engage with and be disengaged from fixed contacts 91 and 93 which are connected respectively to contact arms 45 and 47.

Let it be assumed that the tank is filled entirely with cold water which will have the result of causing movement of bimetal bars 27 and 35 into engagement with fixed contacts 31 and 39 respectively. As soon as contact arm 45 is moved into engagement with contact arm 47, say, at 11 p. m., energization of the heater 21 will occur immediately through a circuit substantially as follows: from supply circuit conductor 41, through the engaged contact arms 45 and 47, through conductor 49, through the contacts 39 and 37 and the bimetal bar 35, then through conductor 51, heater 21, through contacts 29 and 31, and bimetal bar 27, through conductor 53 and coil 55 to the second supply circuit conductor 43.

An energizing circuit will also be closed through the auxiliary heater 79, the circuit being substantially as follows: from the first supply circuit conductor 41, through the engaged contact arms 45 and 47, conductor 49, conductor 71, through adjustable resistor 73, conductor 83, resistor 79 and then through a conductor 95 to fixed contact 29, then through bimetal bar 27, fixed contact 31 and through conductor 53 and coil 55, to the second supply circuit conductor 43. This energization of the resistor 79 will continue until it becomes incandescent to a degree sufficient to cause the light-sensitive cell 75 to become electrically conducting whereby energization of the coil 59 is effected through a circuit substantially as follows: from supply circuit conductor 41, through the engaged contact arms 45 and 47, part of conductor 49, conductor 71, coil 59, conductor 81, through the light-sensitive cell 75 (now electric conducting), through conductor 95, through the lower thermally-actuable switch 25, through conductor 53 and coil 55 to the second supply circuit conductor 43. This will cause engagement of contact bridging member 63 with the fixed contacts 65 and 67. It will be noted that contact 65 is connected to fixed contact 39 while fixed contact 67 is electrically connected to fixed contact 37. This will therefore energize heater 21 through contact bridging member 63 and fixed contacts 65 and 67.

The time when energization of coil 59 will be effected depends, of course, upon the adjustment of adjustable resistor 73 but in any case it is desirable that this energization be effected before bimetal bar 35 has been moved out of engagement with fixed contact 39 when sufficient water in tank 11 has been heated to cause flexure of bimetal bar 35 out of engagement with fixed contact 39. While I have above set forth the desirability of not interrupting energization of heater 21, I am not limited thereto since energization of heater 21 may be interrupted when sufficient hot water is caused to accumulate in the upper part of tank 11 to subject bimetal bar 35 to hot water, reenergization of heater 21 taking place after a relatively short period of time.

Let it now be assumed that energization of heater 21 continues until substantially all of the water in the tank is hot. If this occurs before opening of the time controlled switch, the heater 21 will be deenergized also by the entire system by flexure of bimetal bar 27 out of engagement with contact 31.

If, on the other hand, less than all of the water in the tank has been heated to a value on the order of 150° F., and contact arms 45 and 47 are moved out of engagement with each other as will occur at 6 a. m., contact bridging member 89, which has been moved upwardly into engagement with fixed contacts 91 and 93 of the second heater current controlled electromagnetic switch 85, energization of heater 21 will continue until substantially all of the water in the tank is hot, the length of over-run of the energization of heater 21 being, of course, dependent upon the amount of hot water withdrawn from the tank.

Referring now to the diagram shown in Fig. 2, I have there used a light-sensitive cell 97 which is to be so positioned as to be subject to sunlight during daylight hours, to control the system and to take the place of the time controlled switch comprising contact arms 45 and 47. Light-sensitive cell 97 controls the coil 99 of an electromagnetic switch comprising, in addition to coil 99, an armature core 101 having connected therewith a contact bridging member 103 which is adapted to engage with and be disengaged from two fixed contacts 105 and 107. Supply circuit conductor 41 is connected to one terminal of cell 97 the other terminal of which is connected through a conductor 109 to one terminal of coil 99, the other terminal of which is connected by a conductor 111 to the second supply circuit conductor 43. Supply circuit conductor 41 is connected by a conductor 113 to fixed contact 105 while fixed contact 107 is connected by a conductor 115 to fixed contact 39 of the upper thermally actuable switch 33. Fixed contact 37 is connected by a conductor 51 with one terminal of heater 21, the other terminal being connected to fixed contact 29 of the lower thermally-actuable switch. Fixed contact 31 is connected by a conductor 53 to one terminal of coil 55 of a heater current controlled electromagnetic switch 85, the other terminal of which is connected to the second supply circuit conductor 43.

An electromagnetic switch 57 is provided also as well as a light-sensitive cell 75 which is adapted to be substantially enclosed in a non-light transmitting casing together with a resistor 79.

Let it be assumed that tank 11 has been filled with cold water and that energization of heater 21 was interrupted in substantially the same manner as hereinbefore set forth in the description of Fig. 1 and that enough hot water has been withdrawn from tank 11 to subject both bimetal strips 27 and 35 to cold water. If now this occurs during the time of daylight period when cell 97 will be conducting, no energization of heater 21 will occur until light-sensitive cell 97 becomes subject to darkness and therefore non-conducting because bridging member 103 will be out of engagement with contacts 105 and 107. When this occurs, then contact bridging member 103 will be moved into engagement with fixed contacts 105 and 107 to provide a circuit for the energization of heater 21 substantially as follows: from supply circuit conductor 41, through conductor 113, through the engaged contacts 105 and 107 and contact bridging member 103, through conductor 115, through the closed upper thermally-actuable switch 33, through conductor 51, through heater 21, through the lower thermally-actuable switch 25, through conductor 53, coil 55, to the second supply circuit conductor 43. This energization of heater 21 will continue until sufficient hot water has accumulated in the upper portion of tank 11 to subject bimetal bar 35 thereto when energization of heater 21 will be stopped. At the same time that the energizing circuit through heater 21 was effected as hereinbefore described an energizing circuit was closed through heater 79 which in due course of time, dependent upon the adjustment of resistor 73 became incandescent to a degree sufficient to cause cell 75 to become electric conducting with the result that an energizing current traverses coil 59 of the electromagnetic switch 57 causing engagement of contact bridging member 63 with fixed contacts 65 and 67.

Energization of heater 21 through contact bridging member 63 and fixed contacts 65 and 67 will continue until substantially all of the water in the tank is hot. If substantially all of the water in the tank becomes hot before light-sensitive cell 97 is subject to daylight, the lower thermally-actuable switch 25 will effect deenergization of heater 21 before cell 97 becomes conducting. If, however, cell 97 becomes subject to daylight while less than all of the water in the tank is hot, then the engaged contact bridging member 89 with the fixed contacts 91 and 93 which as has hereinbefore been set forth are connected in parallel with the fixed contacts 107 and 105 will permit energization of heater 21 to continue irrespective of disengagement of contact bridging member 103 with fixed contacts 105 and 107. When substantially all of the water in the tank is hot then bimetal bar 27 will move out of engagement with the upper fixed contact 31 to deenergize not only the heater 21 but also the entire system.

The provision of the adjustable rheostat 73 shown schematically only will permit of varying the time delay between the closure of the time controlled contact arms 45 and 47 or the energization of the electromagnetic switch by cell 97 so that the user of a system of this kind has the means at hand to vary the length of time of delay.

Various modifications may be made in the systems embodying my invention without departing from the spirit and scope thereof, and all such modifications coming clearly within the scope of the appended claims shall be considered as covered thereby.

I claim as my invention:

1. A water heater control system for a hot water tank having an electric heater, a first thermally-controlled switch for said heater subject to tank water temperature at the bottom portion of the tank, a second thermally-controlled switch for said heater subject to tank water temperature at an intermediate portion of the tank and connected in series circuit with said first switch and a third switch for said heater connected in parallel circuit relation with said second switch and comprising an electric actuating coil, a light-sensitive cell connected in series circuit with said actuating coil, and a resistor, the energization of which is controlled by said first switch and which becomes incandescent after a predetermined time period and affects said light-sensitive cell and causes it to become electric conducting, the current traversing said cell and coil causing closure of said third switch, said second switch causing energization of said heater immediately upon the tank being filled with enough cold water to subject said second switch thereto and said third switch causing energization of said heater with a predetermined time period of delay upon the tank being filled with only enough cold water to subject the first switch only thereto.

2. A water heater control system for a hot water tank having an electric heater, a first thermally-controlled switch for said heater subject to tank water temperature at the bottom portion of the tank, a second thermally-controlled switch for said heater subject to tank water temperature at an intermediate portion of the tank and connected in series circuit with said first switch and a third switch for said heater connected in parallel circuit relation with said second switch and comprising an electric actuating coil, a light-sensitive cell connected in series circuit with said actuating coil, and a resistor, the energization of which is controlled by said first switch and which becomes incandescent after a predetermined time period and affects said light-sensitive cell and causes it to become electric conducting, the current traversing said cell and coil causing closure of said third switch, said second switch causing energization of said heater immediately upon the tank being filled with enough cold water to subject said second switch thereto and said third switch causing energization of said heater with a predetermined time period of delay upon the tank being filled with only enough cold water to subject the first switch only thereto, said first control switch causing deenergization of said heater when all of the water in the tank is hot.

3. A water heater control system for a domestic hot water tank having a cold water inlet at its lower end, a hot water outlet at its upper end, a single electric heater near its lower end, a first thermally-controlled switch for said heater subject to tank water temperature near its lower portion, a second thermally-controlled switch for said electric heater subject to tank water temperature intermediate the ends of the tank and connected in series circuit relation with said first switch, an electromagnetic switch for said heater connected in parallel circuit relation with said second switch, means for energizing the coil of said electromagnetic switch comprising a light-sensitive cell connected in series circuit with said actuating coil and a resistor the energization of which is controlled by said first switch and which becomes incandescent after a predetermined time period, affects said cell and causes it to become electric conducting, the current traversing said cell and coil causing closure of said third switch, said first and second switches being adapted to cause immediate energization of said electric heater in case of entry of enough cold water into the tank to subject both said first and second switch to cold water and said first and third switches being adapted to cause energization of said heater after a predetermined time period of delay in case of entry of only enough cold water into the tank to subject the first switch to cold water.

4. A water heater control system for a domestic hot water tank having a cold water inlet at its lower end, a hot water outlet at its upper end, a single electric heater near its lower end, a first thermally-controlled switch for said heater subject to tank water temperature near its lower portion, a second thermally-controlled switch for said electric heater subject to tank water temperature intermediate the ends of the tank and connected in series circuit relation with said first switch, an electromagnetic switch for said heater connected in parallel circuit relation with said second switch, means for energizing the coil of said electromagnetic switch comprising a light-sensitive cell connected in series circuit with said actuating coil and a resistor the energization of which is controlled by said first switch and which becomes incandescent after a predetermined time period, affects said cell and causes it to become electric conducting, the current traversing said cell and coil causing closure of said third switch, said first and second switches being adapted to cause immediate energization of said electric heater in case of entry of enough cold water into the tank to subject both said first and second switch to cold water and said first and third switches being adapted to cause energization of said heater after a predetermined time period of delay in case of entry of only enough cold water into the tank to subject the first switch to cold water, said first control switch being adapted to cause deenergization of said heater when substantially all of the water in the tank is hot.

5. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, the energization of said cell and said resistor being controlled by said first switch, said first and second switch causing energization of said heater when the tank is first filled with cold water, said first and third switch completing heating of all of the water in the tank.

6. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, the energization of said cell and said resistor being controlled by said first switch, said first and second switch causing energization of said heater when the tank is first filled with cold water, said first and third switch completing heating of all of the water in the tank, said first switch causing deenergization of said heater when substantially all of the water in the tank is hot.

7. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, the energization of said cell and said resistor being controlled by said first switch, and causing closure of said third switch with an adjustably predetermined time period of delay, after said first switch is closed by cold water in the bottom portion of the tank.

8. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, the energization of said cell and said resistor being controlled by said first switch, and causing closure of said third switch with an adjustably predetermined time period of delay after said first switch is closed by cold water in the bottom portion of the tank, said first switch causing deenergization of said heater when substantially all of the water in the tank is hot.

9. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater control switch adapted to be in circuit closing position for a predetermined part of each twenty-four hour day and being connected in series electric circuit with said first and said second switches, the energization of said cell and said resistor being controlled jointly by said first and fourth switches, said first, second and fourth switches being effective to cause energization of said heater immediately upon closure of said fourth switch in case said first and second switches are then subject to cold water.

10. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank, and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater control switch adapted to be in circuit closing position for a predetermined part of each twenty-four hour day and being connected in series electric circuit with said first and said second switches, the energization of said cell and said resistor being controlled jointly by said first and fourth switches, said first, electromagnetic and fourth switches being effective to cause energization of said heater with an adjustably predetermined time period of delay, after closure of said fourth switch in case said first switch only is then subject to cold water.

11. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater control switch adapted to be in circuit closing position for a predetermined part of each twenty-four hour day and being connected in series electric circuit with said first and said second switches, the energization of said cell and said resistor being controlled jointly by said first and fourth switches, said first, electromagnetic and fourth switches being effective to cause energization of said heater with an adjustably predetermined time period of delay after closure of said fourth switch in case said first switch only is then subject to cold water, said heater being deenergized by said first switch when substantially all of the water in the tank is hot, in case this occurs before opening of said fourth switch.

12. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch, an electromagnetic control switch for said heater connected in parallel-circuit relation with said second switch, out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater control switch adapted to be in circuit closing position for a predetermined part of each twenty-four hour day and being connected in series electric circuit with said first and said second switches, the energization of said cell and said resistor being controlled jointly by said first and fourth switches, said first, electromagnetic and fourth switches being effective to cause energization of said heater with an adjustably predetermined time period of delay after closure of said fourth switch in case said first switch only is then subject to cold water, said heater being deenergized by said fourth switch in case less than all of the water in the tank is hot when said fourth switch is opened.

13. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series circuit relation with said first switch and said heater, an electromagnetic control switch for said heater connected in parallel-circuit relation with said second switch and out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater contral switch actuated by a continuously operative timer and adapted to be in closed position during off-peak periods of each twenty-four hour day and connected in series circuit with said first and second switches, the energization of said cell and said resistor being jointly controlled by said first and fourth switches, said first, second and fourth switches being effective to cause energization of said heater immediately upon closure of said fourth switch at the start of an off-peak period if said first and second switches are then subject to cold water.

14. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series circuit relation with said first switch and said heater, an electromagnetic control switch for said heater connected in parallel-circuit relation with said second switch and out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater control switch actuated by a continuously operative timer and adapted to be in closed position during off-peak periods of each twenty-four hour day and connected in series circuit with said first and second switches, the energization of said cell and said resistor being jointly controlled by said first and fourth switches, said first, second and fourth switches being effective to cause energization of said heater immediately upon closure of said fourth switch at the start of an off-peak period if said first and second switches are then subject to cold water, said first, electromagnetic and fourth switch being effective to cause energization of said heater with an adjustably predetermined time period of delay after closure of said fourth switch at the start of an off-peak period if said first switch only is subject to cold water.

15. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch and said heater, an electromagnetic control switch for said heater connected in parallel-circuit relation with said second switch and out of close thermal communication with said tank, means for energizing the coil of said electromagnetic switch comprising a light-sensitive cell connected in series circuit with said coil, a resistor which becomes incandescent after a predetermined period of energization to affect said cell and cause it to become electric conducting, a fourth heater control switch actuated by a continuously operative timer and adapted to be in closed position during off-peak periods of each twenty-four hour day and connected in series circuit with said first and second switches, the energization of said cell and said resistor being jointly controlled by said first and fourth switches, said first, second and fourth switches being effective to cause energization of said heater immediately upon closure of said fourth switch at the start of an off-peak period if said first and second switches are then subject to cold water, said first, electromagnetic and fourth switch being effective to cause energization of said heater with an adjustably predetermined time period of delay after closure of said fourth switch at the start of an off-peak period if said first switch only is subject to cold water, said first switch being effective to cause deenergization of said heater if substantially all of the water in the tank is hot before opening of the fourth switch.

16. A system as set forth in claim 12 and including a heater-current controlled electromagnetic switch connected in shunt circuit with said fourth switch and effective to continue energization of said heater after opening of said fourth switch until all of the water in the tank is hot.

17. A water heater control system for a tank having an electric heater, comprising a first thermally-actuable control switch for said heater subject to tank water temperature at the bottom portion of the tank, a second thermally-actuable control switch for said heater subject to tank water temperature intermediate the ends of the tank and connected in series-circuit relation with said first switch and said heater, an electromagnetic control switch for said heater connected in parallel-circuit relation with said second switch and out of close thermal communication with said tank, means for energizing the coil of said electromagnetic switch comprising a light-sensitive cell connected in series-circuit with said coil, a resistor which becomes incandescent after a predetermined period of energization to affect said cell and cause it to become electric conducting, a fourth heater control switch actuated by a continuously operative timer and adapted to be in closed position during off-peak periods of each twenty-four hour day and connected in series circuit with said first and second switches, the energization of said cell and said resistor being jointly controlled by said first and fourth switches, said first, second and fourth switches being effective to cause energization of said heater immediately upon closure of said fourth switch at the start of an off-peak period if said first and second switches are then subject to cold water, said first, electromagnetic and fourth switch being effective to cause energization of said heater with an adjustably predetermined time period of delay after closure of said fourth switch at the start of an off-peak period if said first switch only is subject to cold water, said fourth switch being effective to cause deenergization of said heater if less than all of the water in the tank is hot when said fourth switch opens.

18. A system as set forth in claim 17 and including a heater-current controlled electromagnetic switch connected in shunt circuit with said fourth switch and effective to continue energization of said heater after opening of said fourth switch until all of the water in the tank is hot.

CLARK M. OSTERHELD.